(12) United States Patent
Jeon

(10) Patent No.: US 7,701,688 B2
(45) Date of Patent: Apr. 20, 2010

(54) STRUCTURE FOR INSTALLING LIGHTNING ARRESTER FOR ELECTRIC POLE

(76) Inventor: Yoo Cheor Jeon, 116-dong, 1805-ho, Woobang Dream City, 521, Gamsam-dong, Dalseo-gu, Daegu (KR)

( * ) Notice: Subject to any disclaimer, the term of this patent is extended or adjusted under 35 U.S.C. 154(b) by 274 days.

(21) Appl. No.: 12/022,724

(22) Filed: Jan. 30, 2008

(65) Prior Publication Data
US 2008/0310071 A1   Dec. 18, 2008

(30) Foreign Application Priority Data
Jun. 14, 2007   (KR) .................. 10-2007-0058410

(51) Int. Cl.
*H02H 1/00* (2006.01)
(52) U.S. Cl. ............................ 361/117; 361/39; 361/40; 361/111; 361/118; 361/119; 361/125; 361/127; 361/131; 361/132; 337/28; 337/31; 337/32; 337/33; 337/34
(58) Field of Classification Search ............. 361/39–40, 361/111, 117–119, 125, 127, 131, 132; 337/28, 337/31–34
See application file for complete search history.

(56) References Cited
U.S. PATENT DOCUMENTS

| | | | | | |
|---|---|---|---|---|---|
| 1,389,623 | A | * | 9/1921 | Calloway | ............. 361/131 |
| 3,474,995 | A | * | 10/1969 | Amidon et al. | ......... 248/218.4 |
| 4,308,566 | A | * | 12/1981 | Imataki et al. | ............. 361/125 |
| 4,851,955 | A | * | 7/1989 | Doone et al. | ............. 361/117 |
| 4,864,455 | A | * | 9/1989 | Shimomura et al. | ......... 361/125 |
| 5,172,297 | A | * | 12/1992 | Imakoma et al. | ............ 361/126 |
| 5,283,709 | A | * | 2/1994 | Shirakawa et al. | .......... 361/117 |
| 5,426,555 | A | * | 6/1995 | Lundquist | ................... 361/117 |

\* cited by examiner

*Primary Examiner*—Jared J Fureman
*Assistant Examiner*—Terrence R Willoughby
(74) *Attorney, Agent, or Firm*—Lowe Hauptman Ham & Berner, LLP

(57) ABSTRACT

A structure for installing a lightning arrester between the cross arm mounted to the upper end of an electric pole and a power line is disclosed. A dead end clamp, the lightning arrester and an insulation reinforcing insulator are connected in series, an end of the insulation reinforcing insulator is connected to the cross arm by a shackle, a disconnector is connected to the voltage outlet portion of the lightning arrester, a grounding wire for diverting abnormal voltage to the ground is connected to the disconnector, and an insulation cover surrounds the dead end clamp and the voltage inlet portion of the lightning arrester.

4 Claims, 8 Drawing Sheets

STRUCTURE FOR INSTALLING LIGHTNING ARRESTER FOR ELECTRIC POLE

BACKGROUND OF THE INVENTION

1. Field of the Invention

The present invention relates to a structure for installing a lightning arrester for an electric pole and, more particularly, to a structure for installing a lightning arrester for an electric pole, in which a lightning arrester, a dead end clamp and an insulator are connected in series, so that electric wires can be arranged in an orderly manner on the upper end of an electric pole to prevent the upper end of the electric pole from being in disorder and electrical failure from occurring due to the contact of electric wires with foreign objects such as birds, creatures or a magpie nest, installation work can be conveniently conducted to reduce the installation cost and the maintenance and repair fee, and the number of parts to be installed together with the lightning arrester can be decreased to thus reduce the material cost.

2. Description of the Prior Art

As is well known in the art, an electric pole is employed to support electric wires for supplying electricity from a nearby transformer substation to customers. The electric pole is made of concrete, wood, etc., in consideration of the required size and strength of the electric pole, economy, surrounding geographical conditions, and so on.

Since the electric pole is erected on the ground and supports electric wires in the air, an abnormally high voltage can be formed in the electric wires when a surge such as a thunderbolt is applied thereto. In order to divert the abnormally high voltage to the ground and allow a normal voltage to flow in the electric wires, a lightning arrester is installed on the upper end of an electric pole which is used for a line switch pole, an intermediate line position, an overhead service drop, an underground service drop, or a customer's high voltage reception facility.

In the conventional art, the lightning arrester is separately installed on an electric pole. That is to say, the power line installed on the electric pole and the electric wire for connecting the lightning arrester with the power line are connected with each other by a connector or a sleeve, an insulator for insulation purposes is installed on a cross arm, which is mounted to the electric pole, the lightning arrester is separately erected by a bracket at a different position on the upper end of the electric pole and is tightened along with the insulator by a bolt, and an electric wire extending to the ground is connected to the output portion of the lightning arrester, which is complicated.

In other words, in the conventional art, since the lightning arrester and the insulator are installed together on the cross arm on the upper end of the electric pole, the number of parts increases on the upper end of the electric pole, which is complicated. In addition, substantial installation costs and repair and maintenance fees are incurred, and the complexity can serve as a factor causing accidents that affect workers.

Also, in the conventional art, because the electric wires and so forth are tangled in a complicated pattern on the upper end of the electric pole, spaces between parts decrease, foreign objects are likely to be caught, and conditions suitable for a magpie to make a nest are created, whereby not only the leakage of current in the electric wires but also the damage to the parts installed on the upper end of the electric pole may be caused.

SUMMARY OF THE INVENTION

Accordingly, the present invention has been made keeping in mind the above problems occurring in the prior art, and an object of the present invention is to provide a structure for installing a lightning arrester for an electric pole, in which a lightning arrester, a dead end clamp and an insulator are connected in series, so that electric wires can be arranged in order on the upper end of an electric pole to prevent the upper end of the electric pole from being in disorder and electrical failure and damage to parts from occurring by birds, creatures or a magpie nest, work for installing a connector or a sleeve can be eliminated to allow the installation work to be conveniently conducted and to reduce installation costs and maintenance and repair fees, and the number of parts to be installed together with the lightning arrester can be decreased, thus reducing the material cost.

In order to achieve the above object, according to the present invention, there is provided a structure for installing a lightning arrester between the cross arm mounted to the upper end of an electric pole and a power line, wherein a dead end clamp, the lightning arrester and an insulation reinforcing insulator are connected in series, an end of the insulation reinforcing insulator is connected to the cross arm by a shackle, a disconnector is connected to the voltage outlet portion of the lightning arrester, a grounding wire for diverting abnormal voltage to the ground is connected to the disconnector, and an insulation cover surrounds the dead end clamp and the voltage inlet portion of the lightning arrester.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF A PREFERRED EMBODIMENT

Figure 1:
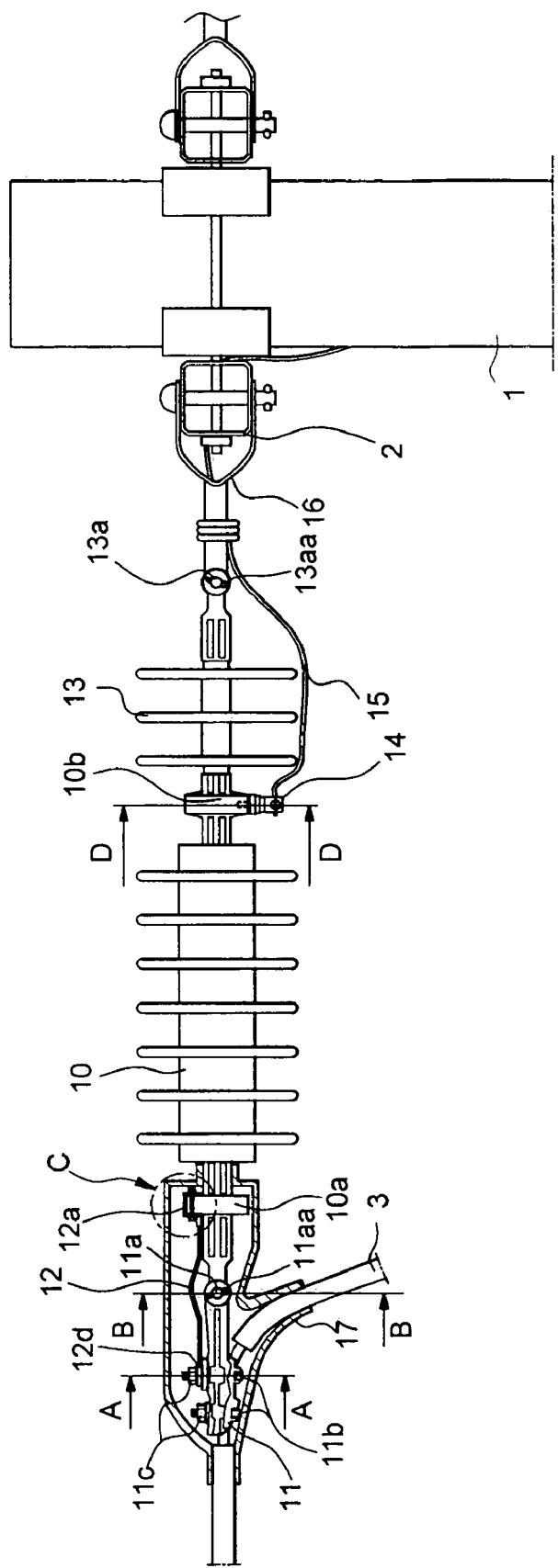
FIG. 1 is a front view illustrating a structure for installing a lightning arrester for an electric pole in accordance with an embodiment of the present invention.

Reference will now be made in greater detail to preferred embodiments of the invention, examples of which are illustrated in the accompanying drawings. Wherever possible, the same reference numerals will be used throughout the drawings and the description to refer to the same or like parts.

FIG. 1 is a front view illustrating a structure for installing a lightning arrester for an electric pole in accordance with an embodiment of the present invention. A lightning arrester 10 is configured such that it is installed between the cross arm 2, mounted to an electric pole 1, and a power line 3.

In the installation structure according to the present embodiment, the lightning arrester 10, a dead end clamp 11, a connection wire 12, and an insulation reinforcing insulator 13 are connected in series. In particular, the lightning arrester 10 and the insulation reinforcing insulator 13 are integrally formed with each other.

The lightning arrester 10 has a voltage inlet portion 10a on one end thereof and a voltage outlet portion 10b on the other end thereof. The voltage inlet portion 10a of the lightning arrester 10 and the dead end clamp 11 are connected to each other by the connection wire 12. The insulation reinforcing insulator 13 is linearly and integrally connected to the other end, that is, the voltage outlet portion 10b, of the lightning arrester 10. A disconnector 14 and a grounding wire 15 are also connected to the voltage outlet portion 10b of the lightning arrester 10.

In detail, the end of the dead end clamp 11, which is connected with the power line 3, is connected to one end of the lightning arrester 10 by a first pin 11a, and the intermediate portion of the dead end clamp 11 and the voltage inlet portion 10a of the lightning arrester 10 are connected to each other by the connection wire 12.

Figure 6:
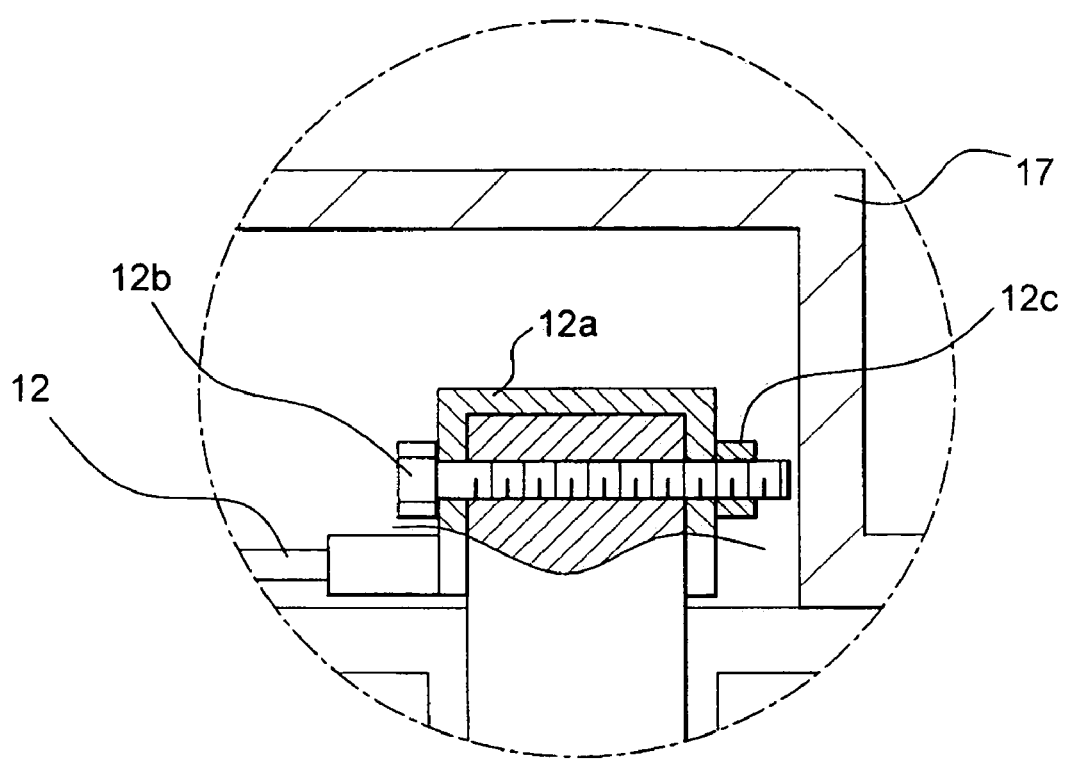
FIG. 6 is an enlarged sectional view of the part 'C' of FIG. 1.

Referring to FIG. 6, a wire connector 12a is integrally coupled and connected to one end of the connection wire 12, and is electrically connected to the lightning arrester 10 by the tightening force of a bolt 12b and a nut 12c. Also, at the other end of the connection wire 12, the terminals of the voltage inlet wire of the lightning arrester 10, which have a ring-shaped configuration, are coupled to connectors 12d such that the connection wire 12 can be connected to the dead end clamp 11.

One end of the insulation reinforcing insulator 13 is connected to the other end of the lightning arrester 10 by a second pin 13a, and a shackle 16 is connected to the other end of the insulation reinforcing insulator 13 to connect the insulation reinforcing insulator 13 to the cross arm 2.

The disconnector 14 is connected to the voltage outlet portion 10b of the lightning arrester 10, and the grounding line 15 for diverting abnormal voltage to the ground is connected to the output portion of the disconnector 14.

Further, in the present invention, an insulation cover 13 for insulating the power line 3 and the dead end clamp 11 from the outside surrounds the dead end clamp 11 and the voltage inlet portion 10a of the lightning arrester 10.

Figure 4:
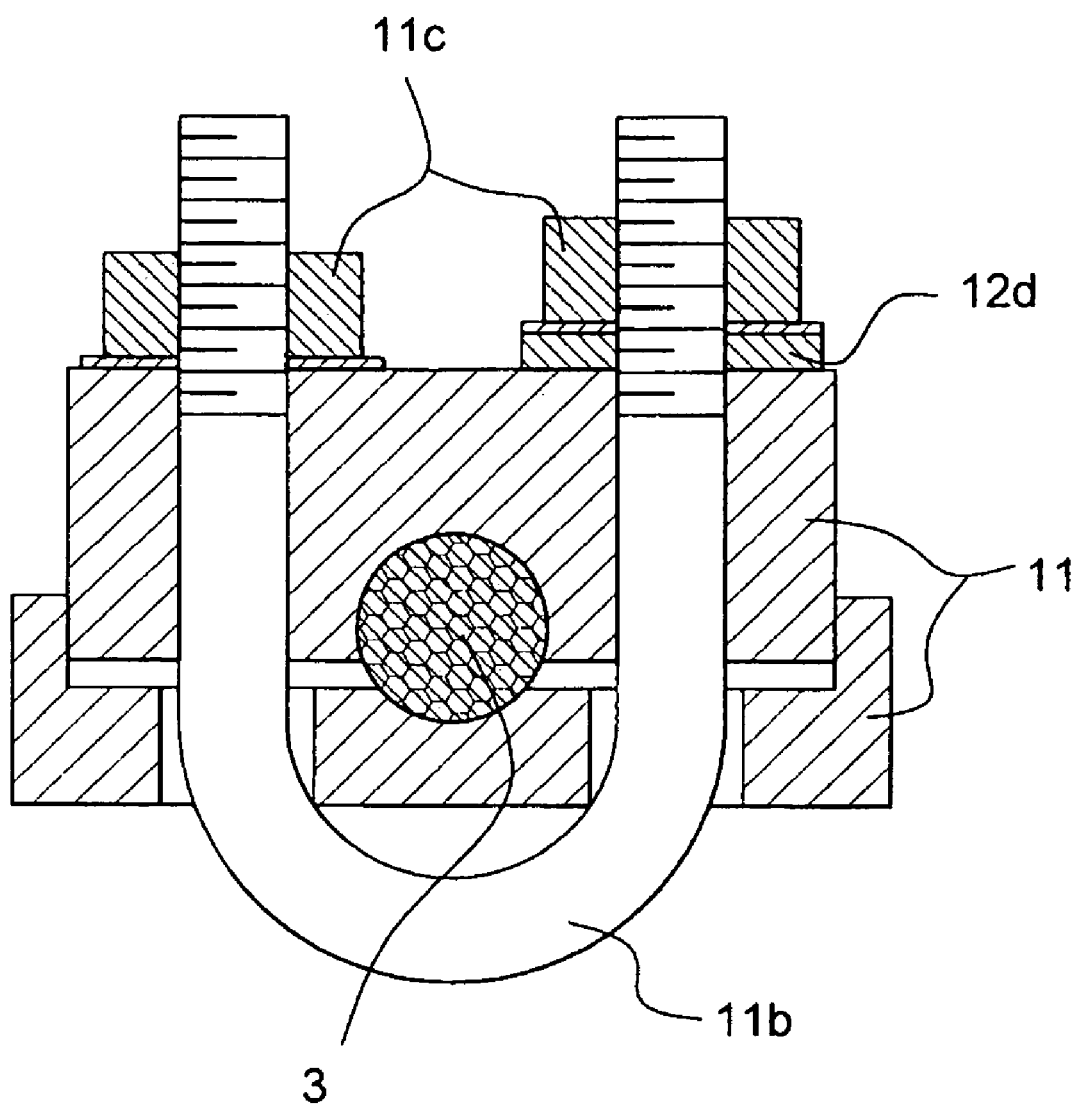
FIG. 4 is a sectional view taken along the line A-A of FIG. 1.
Figure 5:
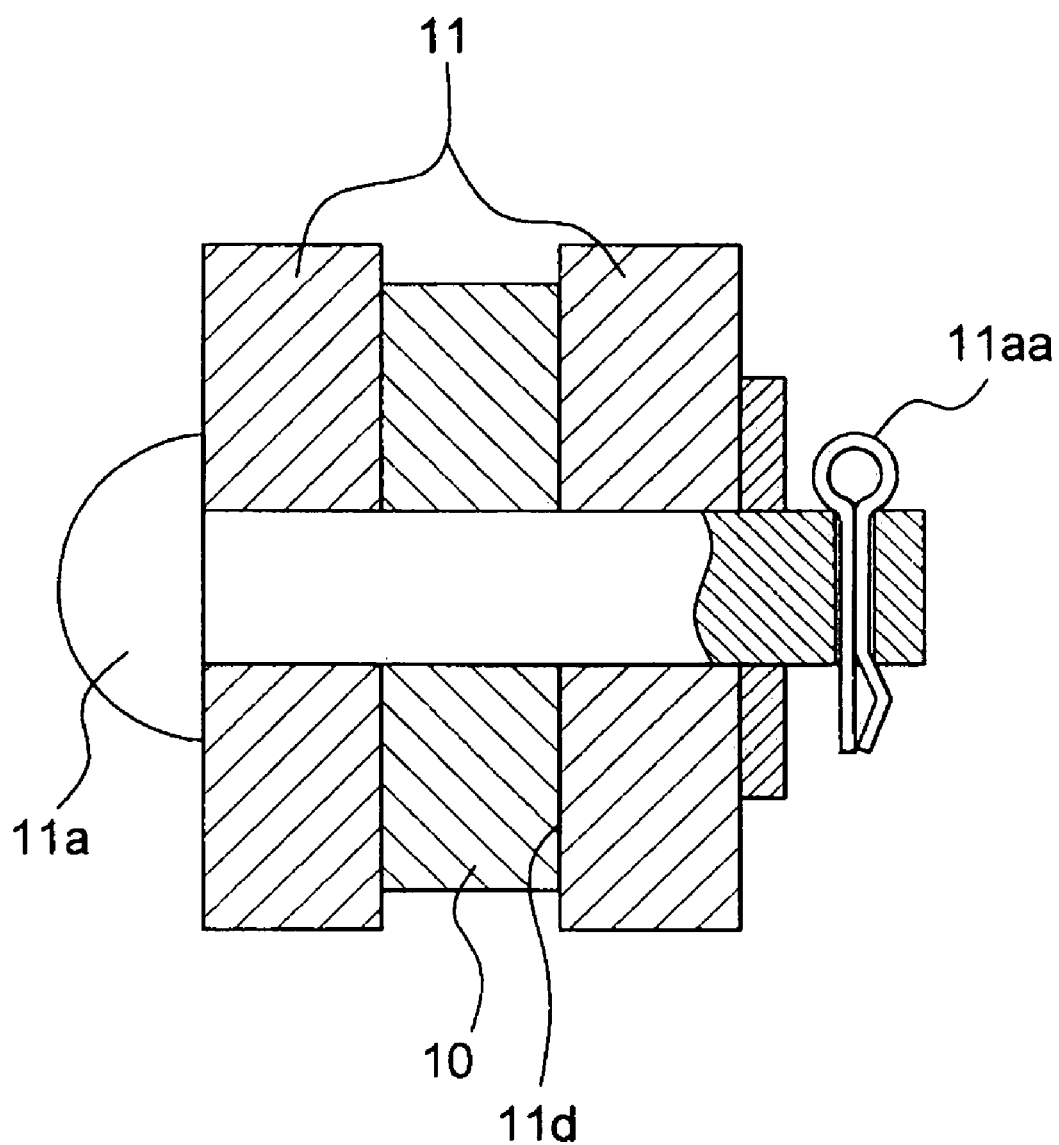
FIG. 5 is a sectional view taken along the line B-B of FIG. 1.

The dead end clamp 11 and the power line 3 are connected with each other by a plurality of U-shaped bolts 11b, as shown in FIG. 4, and the end of the dead end clamp 11 and one end of the lightning arrester 10 are connected to each other by the first pin 11a, as shown in FIG. 5. While not illustrated in detail, the end of the insulation reinforcing insulator 13, integrally formed with the lightning arrester 10, and the end of the shackle 16, are connected to each other by the second pin 13a.

Dowel pins 11aa and 13aa are respectively coupled to the ends of the first pin 11a and the second pin 13a to prevent the pins 11a and 13a from being released.

Figure 7:
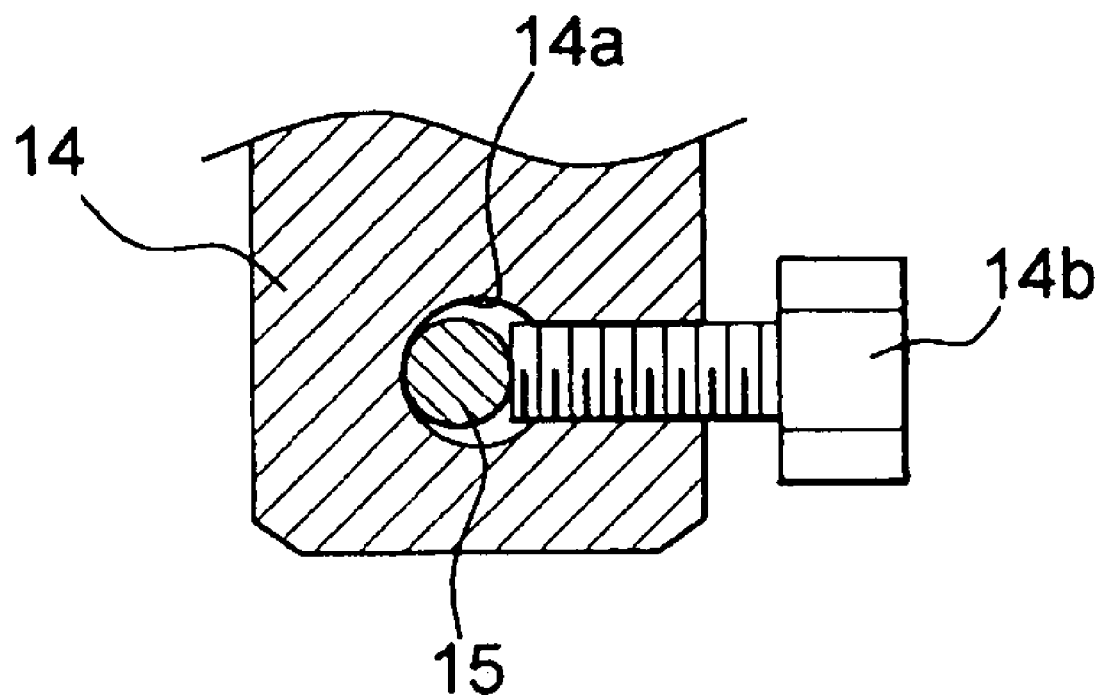
FIG. 7 is a sectional view taken along the line D-D of FIG. 1.

Referring to FIG. 7, a wire insertion hole 14a is defined in the lower end of the disconnector 14, and a thread 14b projecting into the wire insertion hole 14a is locked to the lower end of the disconnector 14 in a direction perpendicular to the wire insertion hole 14a. By this fact, the thread 14b can press the electric wire, that is, the grounding wire 15, inserted into the wire insertion hole 14a.

Figure 2:
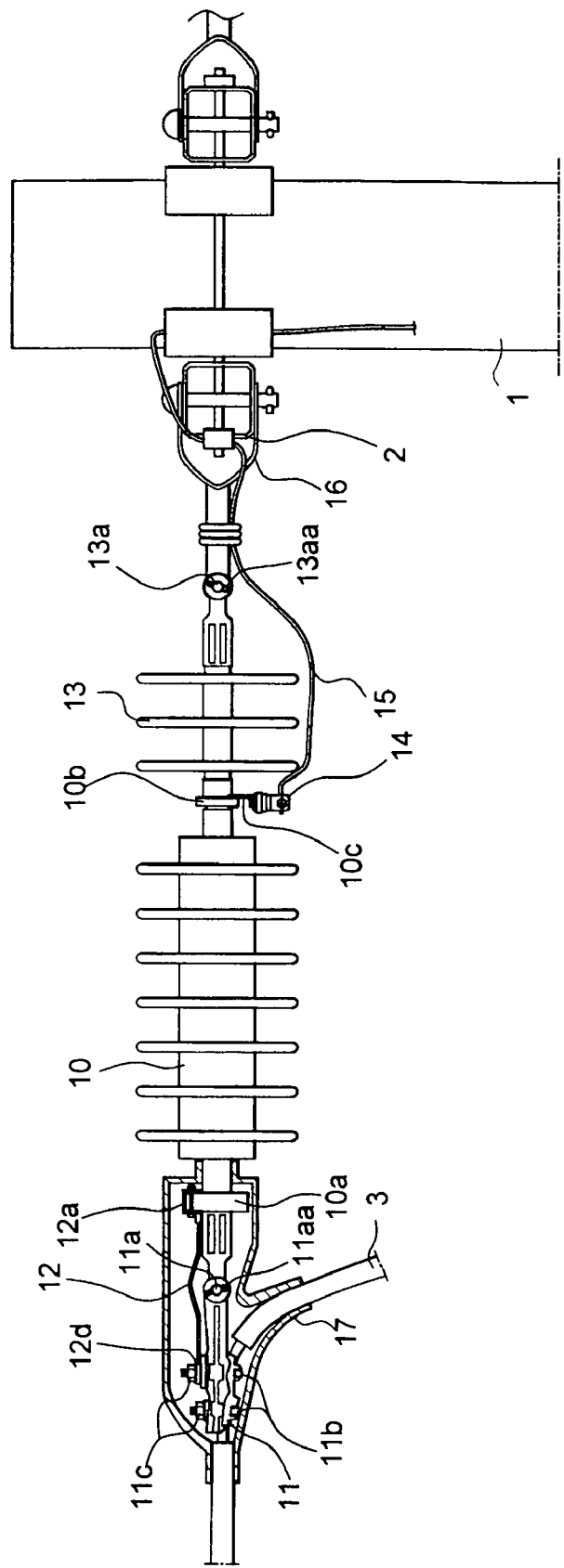
FIG. 2 is a front view illustrating a structure for installing a lightning arrester for an electric pole in accordance with another embodiment of the present invention.

Meanwhile, in the structure for installing a lightning arrester for an electric pole in accordance with another embodiment of the present invention, as shown in FIG. 2, when the disconnector 14 is coupled to the voltage outlet portion 10b of the lightning arrester 10, a bracket 10c can be secured to the voltage outlet portion 10b of the lightning arrester 10, and the disconnector 14 can be mounted to the bracket 10c.

Figure 3:
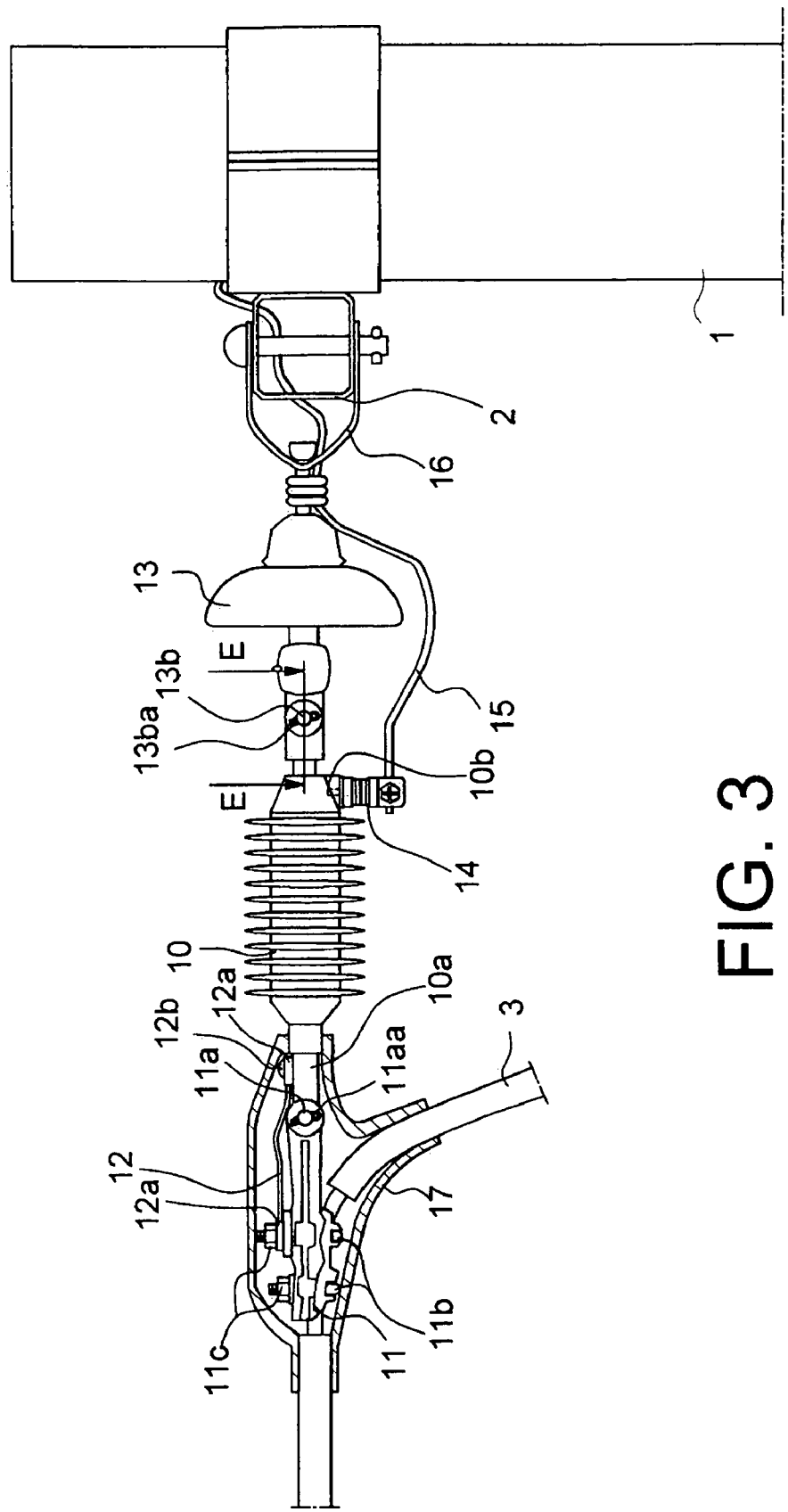
FIG. 3 is a front view illustrating a structure for installing a lightning arrester for an electric pole in accordance with still another embodiment of the present invention.

Also, in the meanwhile, in the structure for installing a lightning arrester for an electric pole in accordance with still another embodiment of the present invention, as shown in FIG. 3, the lightning arrester 10 and the insulation reinforcing insulator 13 can be formed separately from each other, and can be coupled to each other by a third pin 13b.

Figure 8:
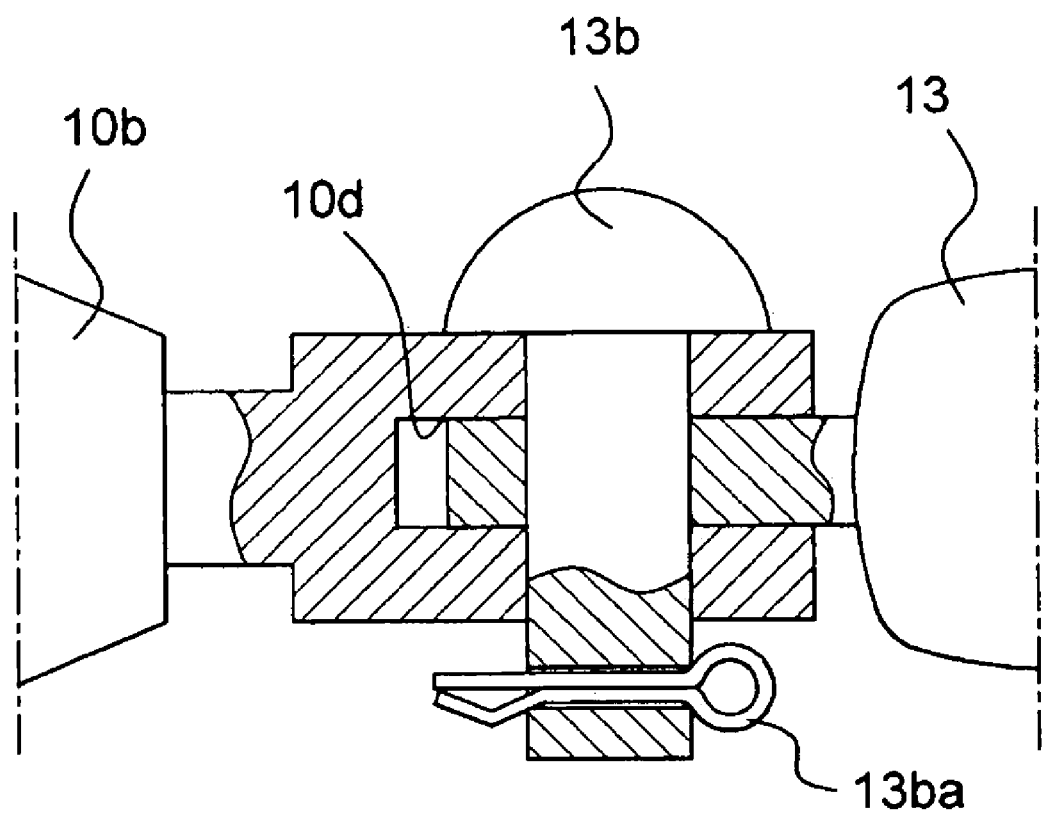
FIG. 8 is a sectional view taken along the line E-E of FIG. 3.

In detail, as shown in FIG. 8, in the present embodiment, after the end of the insulation reinforcing insulator 13 is inserted into an insertion groove 10d which is defined in the voltage outlet portion 10b of the lightning arrester 10, both portions of the lightning arrester 10 and the insulation reinforcing insulator 13 are connected to each other by the third pin 13b. At this time, as described above, a dowel pin 13ba is coupled to the end of the third pin 13b to prevent the third pin 13b from being released.

Hereafter, the operational function of the structure for installing a lightning arrester for an electric pole according to the present invention, constructed as mentioned above, will be described.

First, after a worker connects the dead end clamp 11 and the lightning arrester 10 using the first pin 11a, and connects the shackle 16 and the insulation reinforcing insulator 13 using the second pin 13a, the worker climbs the electric pole 1 and connects the shackle 16 to the cross arm 2, which is mounted to the upper end of the electric pole 1.

Of course, in the case that the lightning arrester 10 and the insulation reinforcing insulator 13 are formed separately from each other, the worker can couple the lightning arrester 10 and the insulation reinforcing insulator 13 to each other using the third pin 13b.

In either way, the intermediate portion of the power line 3, from which a sheath is removed, and the dead end clamp 11 are connected with each other by the U-shaped bolts 11b and nuts 11c. Then, the dead end clamp 11 and the lightning arrester 10 are connected to each other via the connection wire 12, and the dead end clamp 11 and the voltage inlet portion 10a of the lightning arrester 10 are surrounded by the insulation cover 17.

Finally, by connecting the grounding wire 15 to the disconnector 14, the installation of the lightning arrester 10 is completed, whereby the dead end clamp 11, the lightning arrester 10, the insulation reinforcing insulator 13, and the shackle 16 are connected in series.

Accordingly, in the present invention, when viewed in its entirety, since the respective parts are coupled with one another using threads and pins, the installation and the replacement of the lightning arrester can be conveniently conducted, and a working procedure can be greatly simplified compared to the conventional art.

As is apparent from the above description, the structure for installing a lightning arrester for an electric pole according to the present invention provides advantages in that, since a lightning arrester, a dead end clamp and an insulation reinforcing insulator are all connected in series, and the lightning arrester and the insulation reinforcing insulator are linearly and integrally formed with each other, electric wires can be arranged in an orderly manner on the upper end of an electric pole to thus prevent the upper end of the electric pole from being in disorder and prevent electrical failure and damage to parts from being caused by birds, creatures or a magpie nest, work for installing a connector or a sleeve can be eliminated to allow the installation work to be conveniently conducted and to reduce the installation cost and the maintenance and repair fee, and the number of parts to be installed together with the lightning arrester can be decreased to thus reduce the material cost.

In particular, in the present invention, since the upper end of the electric pole does not have a complicated structure and spaces between parts can be increased compared to the conventional art, the likelihood of an accident affecting a worker due to contact with foreign objects is considerably decreased, and also, conditions preventing a magpie from making a nest can be easily created.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A structure for installing a lightning arrester between a cross arm mounted to an upper end of an electric pole and a power line, wherein
    an end of a dead end clamp connected with the power line is connected to one end of the lightning arrester by a first pin,
    an intermediate portion of the dead end clamp and a voltage inlet portion of the lightning arrester are connected to each other via a connection wire,
    an insulation reinforcing insulator is integrally coupled to a voltage outlet portion formed on the other end of the lightning arrester, and an end of the insulation reinforcing insulator is connected to one end of a shackle by a second pin,
    the shackle is connected to the cross arm,
    a disconnector is connected to the voltage outlet portion of the lightning arrester,
    a grounding line for diverting an abnormal voltage to the ground is connected to the disconnector, and
    an insulation cover for insulating the power line and the dead end clamp from the outside surrounds the dead end clamp and the voltage inlet portion of the lightning arrester.

2. The structure according to claim 1, wherein the dead end clamp and the power line are connected with each other by a plurality of U-shaped bolts, a first insertion groove is defined in the end of the dead end clamp such that one end of the lightning arrester is inserted into the first insertion groove, and is connected to the dead end clamp by the first pin, and a second insertion groove is defined in the other end of the lightning arrester such that an end of the insulator is inserted into the second insertion groove, and is connected to the lightning arrestor by the second pin.

3. The structure according to claim 1, wherein a wire insertion hole is defined in a lower end of the disconnector, and a thread is locked to the lower end of the disconnector to project into the wire insertion hole such that the connection wire inserted into the wire insertion hole can be pressed by the thread.

4. The structure according to claim 1, wherein the lightning arrester and the insulation reinforcing insulator are formed separately from each other and are connected with each other by a third pin, and the end of the insulation reinforcing insulator is connected to the cross arm via the shackle.

* * * * *